UNITED STATES PATENT OFFICE.

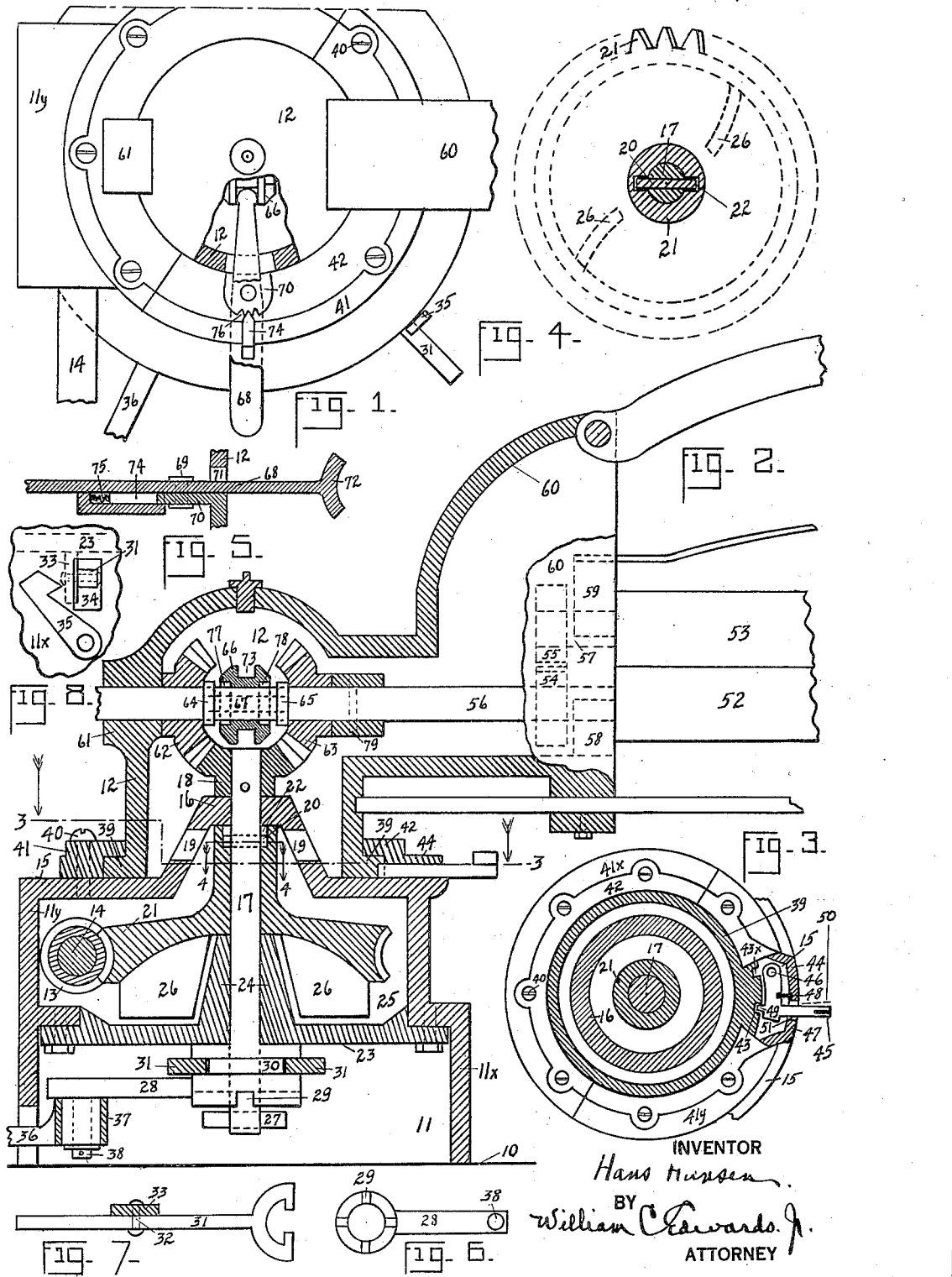

HANS HANSEN, OF KANSAS CITY, MISSOURI.

GEAR TRANSMISSION FOR WASHING-MACHINES AND WRINGERS.

1,400,744.

Specification of Letters Patent.  Patented Dec. 20, 1921.

Application filed April 18, 1921. Serial No. 462,289.

*To all whom it may concern:*

Be it known that I, HANS HANSEN, a citizen of the United States, residing at Kansas City, in the county of Jackson and State of Missouri, have invented certain new and useful Improvements in a Gear Transmission for Washing-Machines and Wringers, of which the following is a description, referring to the drawings which accompany this specification.

The invention relates to an improved assemblage and arrangement of the power mechanism for driving a washing machine of the dasher type and the operation of the wringer in combination therewith. The construction and objects of the invention will be more fully discussed and explained in the references to the drawings, in which Figure 1 is a top view of the transmission case and allied elements with parts in section to disclose operative features of the invention; Fig. 2 shows a sectional view of the device seen in Fig. 1; Fig. 3 is a cross-sectional view taken along the line 3—3, Fig. 2 looking in the direction of the arrows; Fig. 4 is a cross-sectional view taken along the line 4—4, Fig. 2 looking in the direction of the arrows to illustrate constructive features of the worm gear wheel; Fig. 5 is a side view of the wringer clutch shifting device; Fig. 6 is a bottom view of the crank operating the rack bar; Fig. 7 is a plan view of the shifting device for controlling the position of the crank seen in Figs. 2 and 6; Fig. 8 is a fragmentary view of the side of the transmission case showing the hook for locking the shifting lever seen in Figs. 1 and 7. Similar numerals of reference indicate corresponding parts throughout all the figures of the drawings.

Referring to the drawings, the transmission case is adapted for support upon a base level 10 such as the top of a washing machine of the dasher type. The case in its entirety includes a stationary base housing 11, a top housing 12, rotatably mounted upon the stationary housing 11 with other and specific features of the invention in combination therewith as will be further explained.

The walls $11^x$ of the housing 11 are substantially cylindrical being enlarged however at $11^y$ to provide a case and bearings for a worm 13 on the motor shaft 14. The top of the housing 11 is preferably a level surface 15, except at the center thereof where it is drawn upwardly as at 16 to provide a bearing for the vertical drive shaft 17, rotatably mounted therein and rigidly depending from the bevel gear 18 supported on the bearing 16. Alined holes 19, 19 through the housing 11 permit a pin 20 to be driven through a hole in the shaft 17 after it is positioned. A worm gear wheel 21 is then upwardly passed on the shaft 17, a slotted recess 22 engaging with the pin 20 as seen in Fig. 4 and the wheel 21 meshing with the worm 13. A horizontal plate 23, providing a central bearing 24 for the shaft 17 is upwardly slipped thereon, with the central portion 24 supporting the gear wheel 21 in driving relationship to the pin 20 as disclosed. The outer edges of the plate 23, register beneath and are secured to portions integral with the side walls of the housing 11 to provide an oil tight chamber 25. Depending from the under side of the gear wheel 21 are shown curved fin-like members 26, 26. A pin 27 is secured through the lower extremity of the shaft 17. Beneath the plate 23, a crank 28 is slidably mounted on the shaft 17, the under surface of the hub of the crank 28 is upwardly grooved as at 29, while a horizontal groove 30 extends around the hub of the crank. A forked lever 31 pivotally mounted as at 32 to a boss 33 depending from the under side of the plate 23, projects through an opening 34 in the wall of the housing 11; the forked ends of the lever 31 engage within the groove 30 and the hook 35 pivotally mounted on the exterior of the housing 11 is shown in Fig. 1 engaging the lever 31 to hold the crank 28 raised above the pin 27. When the motor shaft 14, worm 13 and gear 21 drive the shaft 17 and it is desired to engage the rack bar 36 (pivotally connected by the bearing 37 to the pin 38 of the crank 28) for washing machine operation, the hook 35 is released as in Fig. 8 whereupon the crank 28 and rack bar 36 will drop by gravity and the grooves 29 lock in engagement with the pin 27. During rotation of the gear 21, the fins 26 create a constant agitation of the oil in the case 25, thoroughly lubricating the worm and gear.

The top housing 12 represents, substantially, an inverted cup-shaped member, smaller in circumference than the base housing 11, and having a flanged edge 39 as a base therefor and supported upon the leveled top 15 of the base housing 11. Rigidly secured by bolts 40 to the top 15 of the base housing 11, is a ring like member 41, preferably fabricated in two sections 41$^x$, 41$^y$, for convenience of assembly.

This ring member 41 has an upper flanged element 42 inwardly extending so that the ring like member 41 not only surrounds the flanged base 39 of the top housing 12, but by means of the element 42 covering the flange 39, thoroughly anchors the top housing to the base housing 11 though permitting rotation of said top housing 12 on the stationary base housing 11 as will be readily understood. A plurality of notches such as is indicated at 43, 43$^x$ are provided at spaced apart intervals around the outer edge of the flange 39. An enlarged portion 44 of the ring portion 41$^y$ houses a hinged lever 45, pivotally mounted as at 46 to the top 15. Between the lever 45 and the side 47 of the portion 44 is shown a coiled spring 48 normally forcing the lug 49 of the lever into a locking engagement with the notch 43 whereby the top housing 12 is rigidly secured to the stationary housing 11. When it is desired to shift the wringer, later described, to a different position, the handle 45 of the lever and which projects without the housings through the slot 51 in the element 47, is moved to the dotted position 50, against the spring pressure 48, thus releasing the lug 49 from engagement with the notch 43 and permitting rotation of the top housing 12 through a desired arc when the lug 49 is again permitted to engage with another notch of the 43, 43$^x$ series.

The wringer rolls 52, 53 are driven by gears indicated at 54, 55, housed respectively on the shafts 56, 57 mounted in bearings 58, 59 carried in a housing element 60 formed as an offset or enlarged portion of the top rotatable housing 12; the shaft 56 continues to the opposite side of the member 12 where it is mounted in the enlarged bearing portion 61 on such member 12. Upon the shaft 56 are rotatably mounted a forward miter or bevel gear 62 and a reverse miter or bevel gear 63 having clutch jaws 64 and 65 respectively, inwardly disposed toward each other; these gears constantly engage and are driven by the gear 18. A clutch 66 is slidably arranged on a keyway 67 on the shaft 56 intermediate these gears and in the position illustrated stands in neutral. A lever 68 pivoted at 69 on a boss 70 on the exterior of the housing 12 passes through the slot 71 in housing 12, its inner face 72 engaging within a groove 73 in the clutch 66. The lever 68 is provided with a dog 74 spring actuated at 75 to engage notches 76 in the outer face of the boss 70; this dog 74 permitting a desired pivoted movement of the lever 68 so that the clutch faces 77 or 78 may engage with either the jaws 64 or 65 depending upon whether forward or backward rotation is desired for the shaft 56 through clutch engagement with the gear wheels when in operation.

As previously stated, the wringer may be moved to any desired position by the rotation of the top housing 12; it will be noted in this connection that the gears 62 and 63 will turn in meshed engagement with the gear 18 in this top housing rotation movement. The collar 79 pinned to the shaft 56 holds the gear 63 in operative position.

It will be noted that the shaft 56 at the left of Fig. 2 extends preferably without the bearing portion 61. Upon this extended portion a gear, coupling, pulley or other mechanical element may be attached. Many devices such as cream separators, churns, ice cream freezers can thus be motor driven through my transmission with the apparent advantages accruing. One principal object, however, in so extending the shaft 56 is to furnish a means for driving the roller of a mangle or ironing machine such as might be brought into juxtaposition therewith and whereby one power mechanism would thus serve to propel the driving mechanisms of all the elements incidental to laundry operations.

Such modifications may be employed as lie within the scope of the appended claims.

Having fully described my invention what I now claim as new and desire to secure by Letters Patent is:

1. In gear transmissions, a stationary base housing substantially cylindrical in wall section, a top cover therefor and integral therewith, said cover having a level surface except at the center thereof where it is drawn upwardly to provide a vertical shaft bearing; a horizontal plate rigidly disposed at a spaced distance beneath said cover, a vertical shaft bearing therein, a shaft in said bearings and an oil tight chamber included between said cover and plate.

2. In gear transmissions, a stationary base housing substantially cylindrical in wall section, a top cover therefor and integral therewith, said cover having a level surface except at the center thereof where it is drawn upwardly to provide a vertical shaft bearing; a horizontal plate rigidly disposed at a spaced distance beneath said cover, a vertical shaft bearing therein, a shaft in said vertical bearings, a worm gear rigid with said shaft intermediate said cover and plate, and fins rigid with said worm.

3. In gear transmissions, an inverted cup shaped top housing member, an outwardly flanged circular base as an edge support therefor, vertical notches arranged at spaced intervals in the outer periphery of said flanged base and a horizontal shaft bearing arranged at one side of said top housing and an enlarged gear housing arranged as an offset in the wall of said housing and opposite said shaft bearing.

4. In gear transmissions, a stationary base housing, a top cover therefor and integral therewith, said cover having a level surface except at the center thereof where it is drawn upwardly to provide a vertical shaft bearing; an inverted cup shaped top housing having an outwardly flanged circular base supported upon the leveled top surface of the base housing, an inwardly flanged ring-like member rigidly secured to said base housing and enveloping the flanged base of the top housing to permit of rotation of said top housing on said base housing.

5. In gear transmissions, a stationary base housing, a top cover therefor and integral therewith, said cover having a level surface except at the center thereof where it is drawn upwardly to provide a vertical shaft bearing; an inverted cup shaped top housing having an outwardly flanged circular base supported upon the leveled top surface of the base housing, an inwardly flanged ring-like member rigidly secured to said base housing and enveloping the flanged base of the top housing to permit of rotation of said top housing on said base housing; notches arranged at spaced intervals in the periphery of said flanged base of the top housing, a lever pivotally supported on the base housing and adapted to engage or disengage the notches in the base of said top housing for the purposes specified.

6. In gear transmissions, a stationary base housing, a top cover therefor and integral therewith, said cover having a level surface except at the center thereof where it is drawn upwardly to provide a vertical shaft bearing; an inverted cup shaped top housing having an outwardly flanged circular base supported upon the leveled surface of the base housing, an inwardly flanged ring-like member rigidly secured to said base housing and enveloping the flanged base of the top housing to permit of rotation of said top housing on said base housing; vertical notches arranged at spaced intervals in the periphery of said flanged base, a lever pivotally supported on the base housing and adapted to engage or disengage the notches as desired; a horizontal shaft bearing at one side of the top housing and an enlarged gear housing formed as an offset in the wall of said top housing on the side opposite said shaft bearing.

7. In gear transmissions, a stationary base housing, a top cover therefor and integral therewith, said cover having a level surface except at the center thereof where it is drawn upwardly to provide a vertical shaft bearing; an inverted cup shaped top housing having an outwardly flanged circular base supported upon the leveled surface of the base housing, an inwardly flanged ring-like member rigidly secured to said base housing and enveloping the flanged base of the top housing to permit of rotation of said top housing on said base housing; notches arranged at spaced intervals in the periphery of said flanged base, a lever pivotally supported by the base housing and adapted to engage or disengage the said notches as desired; a horizontal shaft bearing at one side of said top housing and an enlarged gear housing formed as an offset in the wall of said top housing on the side opposite said shaft bearing, a wringer roll shaft arranged in said top housing bearings and a wringer roll gear on said shaft in the enlarged gear housing; a horizontal plate in and rigid with said base housing and a bearing therein, a vertical drive shaft through said bearing and through the bearing in the cover of said base housing, a gear rigid with said shaft above said cover bearing and gears on the wringer shaft enmeshed therewith; a clutch and clutch shifting mechanism for engaging the wringer shaft to either of said gears on the wringer shaft; a worm and a worm gear within the base housing for actuating the vertical shaft and a crank on the base of said shaft and clutch mechanism for engaging or disengaging said crank from said shaft.

HANS HANSEN.

Witnesses:
WILLIAM C. EDWARDS, Jr.,
FRANK A. BECKER.